United States Patent Office 3,732,082
Patented May 8, 1973

3,732,082
METHOD OF PRODUCING SUBSTANTIALLY DUST FREE CALCIUM CHLORIDE PARTICULATE
Robert S. Kolat, Bay, and Raymond K. Hudson, Caro, Mich., assignors to The Dow Chemical Company, Midland, Mich.
No Drawing. Filed Aug. 11, 1970, Ser. No. 63,004
Int. Cl. B01j 6/00; C01f 11/18
U.S. Cl. 23—304                                    12 Claims

ABSTRACT OF THE DISCLOSURE

A process for producing substantially dust and fines free particulate calcium chloride wherein at least the particulate surface is glazed by exposure to heat above the temperature at which a glaze occurs, while simultaneously preventing agglomeration of the particulate by agitation until the calcium chloride surface cools to below this temperature. Exposure time to temperatures in excess of the glaze temperature determines the depth of the glazed zone.

BACKGROUND OF THE INVENTION

This invention pertains to the production of calcium chloride particulate, but more specifically to the formation of a hard glazed surface thereon. U.S. Pats. 2,646,343 issued July 21, 1953, 3,250,593 issued May 10, 1966, and 3,493,332 issued Feb. 3, 1970 disclose methods of producing substantially anhydrous calcium chloride pellets. Though such processes produce granulated substantially anhydrous calcium chloride, the individual granules consist of many small, irregular and loosely held particles. Consequently, granules so formed are fragile and serious difficulties ensue in handling from quantities of dust and fines resulting from intergranule abrasion. Mechanical forces applied to the calcium chloride particles during transit can break the primary particles into smaller secondary pieces wherever weak areas occur within the structure. In addition to the ecologically undesirable dust problem caused, the fine calcium chloride fraction is frequently responsible for exaggerating difficulties with cracking and poor flow behavior of the granules. Dust as herein described is that portion of the material capable of passing through a U.S. No. 325 sieve, i.e., 44 microns. Fines are that portion smaller than the particulate and larger than 44 microns.

The difficulties associated with the fragility of granular calcium chloride and subsequent formation of dust and fines have caused serious and costly damage to the interior of the transporter's equipment. Furthermore, a calcium chloride product substantially free of dust and fines smaller in size than the initially produced particulate is preferable to the ultimate consumer.

One object of the present invention, therefore, is to provide an improved method of producing anhydrous calcium chloride which avoids the hereinbefore discussed difficulties, without interfering with the beneficial properties of the particulate, i.e., water vapor absorption and ice melting properties.

Another object is to provide a method to reduce the dusting of anhydrous, particulate calcium chloride to reduce pollution resulting therefrom.

Other objects and advantages will become apparent from the description of the invention which follows:

INVENTION

The above and other objects and advantages have been achieved by exposing particulate calcium chloride to an elevated temperature for a period of time sufficient to cause a glaze to form on the particulate surface while simultaneously preventing agglomeration of said particulate during the period of exposure to said temperature. The term "glaze" as herein used, is defined as a hard, cohesive, light reflecting condition produced by subjection of the particulate to a sufficient temperature to cause fusing or sintering of at least the surface.

The aforementioned problems were thus solved by forming on the calcium chloride granules a hard, smooth glazed surface more resistant to breakage and the consequent formation of dust and fines than the initial particles introduced into the claimed process. It was unexpected that thermally fusing or sintering the surface of anhydrous calcium chloride would result in the uniform, hard shell resistant to abrasive forces and breaking without adversely affecting the aforementioned desirable properties of the product. It was determined that up to approximately 90% of the dust formation was prevented through the formation of said glazed surfaces.

PREFERRED INVENTION

The process of the present invention comprises heating particulate calcium chloride produced by the aforementioned patented processes or by a variety of other methods to a temperature at which glazing occurs. Most frequently the starting particulate form so used will be either granulated or in the form of small particles, but larger sizes can also be improved by the process. The fusing temperature range of commercially available calcium chloride is about 700° C. to about 770° C. A hard, glazed surface is formed by maintaining said calcium chloride at or above the fusing temperature until at least surface fusion occurs. However, the temperature utilized may deviate substantially from the minimum fusion temperature. For instance, acceptable sintering to achieve glazing is attainable by holding the particles at a temperature of at least approximately 500° C. for a period from 10 to 20 minutes. The exact time of exposure is not critical, however, and the benefits of the invention are realized in some measure upon exposure at such temperatures for periods as short as a few seconds up to as long as is required to fuse the entire particulate mass. The uniformity and depth of the glazed surface is adjusted by varying the temperature and time held at specific temperatures.

A temperature and time may be established to produce a calcium chloride pellet with a fused surface and a porous interior composed of the original, small loosely held particles without greatly altering the bulk density of the particle initially introduced into claimed process. A part of this invention is the formation of a wholly fused particle achieved by modifying the time and temperature, or either of these variables separately, to afford a completely fused particle. Such a fused particle retains the desirable attribute of ice melting while attaining a higher bulk density. This attribute of increasing the bulk density affords shipment of greater quantities of calcium chloride particulate in the same space as formerly necessitated for the initial anhydrous material.

Rate of heating the particulate to a temperature required for glazing is critical only when water comprises in excess of approximately 25% by weight of the calcium chloride particulate. Greater quantities of included water necessitate gradual heating to avoid what is known in the art as "popcorn" or the fracturing of individual granules from the excessively rapid water vapor expansion within the granule. It is preferable, therefore, the starting particulate calcium chloride contain a maximum of about 25% by weight water.

Simultaneously with maintaining the calcium chloride at the desired glazing temperature and, additionally, until cooling said calcium chloride below the glazing temperature, agglomeration of said calcium chloride is prevented. Preventing agglomeration of the calcium chloride may be accomplished by a number of procedures. Examples include pouring the calcium chloride into a rotatable container, such as a drum or cone, and rotating the container. The utilization of a fluid bed or dropping the particulate through a heated zone in a column are also acceptable. Such agitation or mixing of the particulate mass is essential to avoid agglomeration or fusing of the multiple particles.

The final anhydrous product of the above process is a calcium chloride particulate resistant to abrasive forces. Table I illustrates the success of this process for 200 gram samples of calcium chloride particles vibrated in a container with approximately 400 grams of one-half inch diameter steel balls for ten minute periods. It is apparent from Table I the combined fine and dust fraction was reduced and objective achieved by practice pursuant to this invention. Samples of particulate taken before thermal treatment as well as after exposure to varying temperatures are represented in Table I. The indicated temperatures represent the thermal condition at a position centrally located in the particulate mass. The minimum glazing temperature was attained when the particulate surface had a light reflecting appearance upon cooling after treatment.

The following examples are indicative of the practice of the inventive, but it is understood that the invention is not limited thereto.

TABLE I.—EXAMPLES 1-7

| Thermal treatment temperature (° C.) | Amount of dust and fines resulting | |
|---|---|---|
| | Fines, g. | Dust, g. |
| As received | 1.22 | 0.48 |
| 200 | 0.53 | 0.50 |
| 404 | 0.34 | 0.41 |
| 450 | 0.11 | 0.21 |
| 500 | 0.08 | 0.17 |
| 545 | 0.05 | 0.07 |
| 550 | 0.04 | 0.06 |
| 566 | 0.03 | 0.08 |
| 595 | 0.03 | 0.28 |

EXAMPLE 8

A rotating cone of 8 inches length with large and small diameters of 8 and 4 inches, respectively, was used to prevent the granules from agglomerating once their surfaces were glazed. Three baffles were soldered into the cone for better agitation. Heat was applied to the external wall of the cone with two natural gas-air burners operating at flame temperature of approximately 2,000° C., while the cone was slowly rotated. A 500 gram quantity of substantially anhydrous calcium chloride granules was placed in the cone and a flow of nitrogen gas directed into the pellet bed. Heating continued until the bed temperature reached approximately 550° C., indicating the portion of the bed closest to the cone wall exceeded the temperature necessary for glazing of calcium chloride. This temperature was maintained for a period of 10 to 20 minutes. The calcium chloride was then cooled sufficiently to insure the surface was below the glazing temperature. Rotation of the cone was continued during the cooling cycle. The resulting granules had a glazed appearance, indicating a hard, smooth surface.

EXAMPLE 9

To further substantiate the feasibility of the instant method in processing larger quantities of material, a rotary drum dryer was charged with 80 pounds of calcium chloride particulate. The drum was heated with 2,000° C. gas fired burners both internally and externally until a thermocouple in the center of the calcium chloride mass reached an operating temperature of approximately 500° C. At this temperature the particulate in contact with the rotary drum dryer was at or exceeded the calcium chloride glazing temperature. Concurrently with maintaining the temperature of the rotary drum dryer at the desired temperature, it was necessary to continuously agitate the particulate by rotating said drum. This latter step was required to avoid agglomeration of the particulate. The resulting particulate had a glazed appearance, indicating a hard smooth surface.

EXAMPLES 10-17

The effect of thermal treatment upon the ice melting capacity of the particulate calcium chloride is shown in Table II. Samples used in these tests were 10 gram quantities of −7 mesh +10 mesh calcium chloride heated at 550° C. for 10 minutes. Similar quantities of as received particulate were used for comparison purposes. Each of the samples was placed in contact with the ice surface and maintained at a temperature of 0° F. Weight of ice melted was determined after the stipulated time interval to ascertain the effectiveness of the material for melting ice at this low temperature.

TABLE II

| | Ice melted (grams) | |
|---|---|---|
| Elapsed time (minutes) | As received | Heat treated |
| 15 | 17.9 | 19.4 |
| 30 | 24.0 | 24.2 |
| 45 | 25.6 | 25.3 |
| 60 | 26.7 | 28.9 |

Friability and handling tests provided verification that glazing of the surface of the calcium chloride surface reduced fines and dust under both laboratory and simulated production conditions.

As indicated by the foregoing discussion, examples, and tables, it is apparent that glazing at least the surface of individual calcium chloride particulate significantly improves the abrasion resistance without detrimentally effecting the desirable properties of ice melting and water absorption.

We claim:

1. A process to form a glazed surface on a solid calcium chloride particulate in order to reduce breakage comprising exposing the particulate to an elevated temperature of at least about 500° C. for a period of time sufficient to cause a hard glaze to form on the particulate surface; cooling the particulate to below the glazing temperature; and simultaneously agitating the heated particulate to prevent agglomeration of the particulate during exposure at the glazing temperature.

2. The process in claim 1 wherein the particulate is heated to the desired temperature within a rotating cone.

3. A process to form a glazed surface on a solid calcium chloride particulate comprising:
  (a) feeding solid particulate into a heatable zone,
  (b) heating the particulate to a temperature of at least 500° C.,
  (c) maintaining the particulate at the desired temperature until at least surface glazing occurs,
  (d) cooling the heated particulate to below the glazing temperature,
  (e) simultaneously agitating the heated particulate to prevent agglomeration thereof to thereby produce a glazed particulate calcium chloride resistant to abrasive forces.

4. The process in claim 3 wherein in step (e) agitating is carried out in a rotating cone.

5. The process in claim 3 wherein the starting particulate calcium chloride is granulated.

6. The process in claim 3 wherein the starting particulate calcium chloride preferably contains a maximum of about 25% by weight water.

7. The process of claim 3 wherein at least the particulate surface is glazed by heating the surface to at least the fusion temperature of the calcium chloride.

8. The process of claim 3 wherein the surface is heated to at least about 700° C.

9. The process of claim 3 wherein the surface is heated to at least about 770° C.

10. The process of claim 3 wherein the particulate of step (a) is substantially anhydrous.

11. The process of claim 1 wherein at least the particulate surface is glazed by heating the surface to at least the fusion temperature of the calcium chloride.

12. The process of claim 1 wherein the exposed particulate is substantially anhydrous.

References Cited
UNITED STATES PATENTS

| | | | |
|---|---|---|---|
| 1,852,303 | 4/1932 | Heath | 23—304 |
| 1,951,886 | 3/1934 | Sundstrom | 23—304 |
| 2,561,055 | 7/1951 | Hood | 23—313 |
| 2,646,343 | 7/1953 | Bennett et al. | 23—313 |
| 2,671,009 | 3/1954 | Comstock | 23—313 |
| 2,839,360 | 6/1958 | Gump et al. | 23—304 |
| 3,030,657 | 4/1962 | Reppert | 23—313 |
| 3,040,375 | 6/1962 | Rowen | 23—313 |
| 3,231,413 | 1/1966 | Berquin | 23—313 |
| 3,250,593 | 5/1966 | Wilcox et al. | 23—313 |
| 3,339,618 | 9/1967 | Bowden et al. | 23—313 |

NORMAN YUDKOFF, Primary Examiner

R. T. FOSTER, Assistant Examiner

U.S. Cl. X.R.

23—293, 313; 423—430